(12) United States Patent
Izutani et al.

(10) Patent No.: US 12,287,156 B2
(45) Date of Patent: Apr. 29, 2025

(54) PARTITION PLATE, TOTAL HEAT EXCHANGE ELEMENT AND TOTAL HEAT EXCHANGER INCLUDING PARTITION PLATE, AND METHOD FOR PRODUCING PARTITION PLATE

(71) Applicant: Mitsubishi Electric Corporation, Tokyo (JP)

(72) Inventors: Tasuku Izutani, Tokyo (JP); Shinya Tokizaki, Tokyo (JP); Takumi Oho, Tokyo (JP); Hajime Sotokawa, Tokyo (JP); Xin Wang, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 186 days.

(21) Appl. No.: 18/030,294

(22) PCT Filed: Oct. 23, 2020

(86) PCT No.: PCT/JP2020/039905
§ 371 (c)(1),
(2) Date: Apr. 5, 2023

(87) PCT Pub. No.: WO2022/085178
PCT Pub. Date: Apr. 28, 2022

(65) Prior Publication Data
US 2023/0375282 A1 Nov. 23, 2023

(51) Int. Cl.
*F28F 3/00* (2006.01)
*F28D 21/00* (2006.01)

(52) U.S. Cl.
CPC .............. *F28D 21/0015* (2013.01)

(58) Field of Classification Search
CPC .................................. F28D 21/0015
(Continued)

(56) References Cited

U.S. PATENT DOCUMENTS

| 2006/0090650 A1 | 5/2006 | Yamakawa et al. |
| 2012/0205081 A1 | 8/2012 | Terai et al. |

(Continued)

FOREIGN PATENT DOCUMENTS

| CN | 101373747 A | * | 2/2009 |
| CN | 202719635 U | * | 2/2013 |

(Continued)

OTHER PUBLICATIONS

Office Action dated Nov. 4, 2024 issued in corresponding CN patent application No. 202080106108.2 (and English translation), 21pp.
(Continued)

*Primary Examiner* — Davis D Hwu
(74) *Attorney, Agent, or Firm* — XSENSUS LLP

(57) ABSTRACT

Provided is a partition plate used in a ventilator that supplies air and exhausts air at the same time. The partition plate includes: a first layer including a first porous substrate having a plurality of first pores, the first layer having a first pinhole formed by at least some of the first pores; a second layer stacked on the first layer and including a second porous substrate having a plurality of second pores, the second layer having a second pinhole formed by at least some of the second pores, the second pinhole being located at a position different from a position facing the first pinhole; and a third layer stacked on the second layer and made of a water-insoluble moisture-permeable resin.

17 Claims, 4 Drawing Sheets

(58) Field of Classification Search
USPC .......................................................... 165/166
See application file for complete search history.

(56) References Cited

U.S. PATENT DOCUMENTS

| | | | |
|---|---|---|---|
| 2015/0198390 A1 | 7/2015 | Ootomo et al. | |
| 2021/0164737 A1 | 6/2021 | Nishioka et al. | |

FOREIGN PATENT DOCUMENTS

| | | | |
|---|---|---|---|
| CN | 106068153 A | * | 11/2016 |
| CN | 207283513 U | | 4/2018 |
| CN | 111341292 A | * | 6/2020 |
| EP | 0661502 A2 | | 7/1995 |
| JP | 7-133994 A | | 5/1995 |
| JP | 2006-150323 A | | 6/2006 |
| JP | 2010-215918 A | | 9/2010 |
| JP | 2013-015286 A | | 1/2013 |
| JP | 2013242130 A | | 12/2013 |
| JP | 2014-055683 A | | 3/2014 |
| JP | 2015-178949 A | | 10/2015 |
| JP | 2020-038024 A | | 3/2020 |
| JP | 2020-125893 A | | 8/2020 |
| JP | 2020-153647 A | | 9/2020 |
| WO | 2011/058854 A1 | | 5/2011 |
| WO | 2012/018089 A1 | | 2/2012 |
| WO | 2016/191868 A1 | | 12/2016 |
| WO | 2019/111793 A1 | | 6/2019 |
| WO | 2019/244204 A1 | | 12/2019 |

OTHER PUBLICATIONS

International Search Report and Written Opinion mailed on Nov. 24, 2020, received for PCT Application PCT/JP2020/039905, filed on Oct. 23, 2020, 11 pages including English Translation.

Notice of Reasons for Refusal mailed on Apr. 6, 2021, received for JP Application 2021-508327, 11 pages including English Translation.

Extended European Search Report issued Dec. 13, 2023, in corresponding European Patent Application No. 20958727.8, 8 pages.

Office Action dated Feb. 18, 2025 issued in corresponding CN patent application No. 202080106108.2 (and English translation).

* cited by examiner

PARTITION PLATE, TOTAL HEAT EXCHANGE ELEMENT AND TOTAL HEAT EXCHANGER INCLUDING PARTITION PLATE, AND METHOD FOR PRODUCING PARTITION PLATE

CROSS-REFERENCE TO RELATED APPLICATION

The present application is based on PCT filing PCT/JP2020/039905, filed Oct. 23, 2020, the entire contents of which are incorporated herein by reference.

TECHNICAL FIELD

The present disclosure relates to a partition plate used in a ventilator that supplies air to a room from outside and exhausts air from the room to outside at the same time, a total heat exchange element including the partition plate, a total heat exchanger including the partition plate, and a method for producing a partition plate.

BACKGROUND ART

Ventilation methods without loss of the indoor cooling and heating effect include a ventilation method with exchange of heat between the air supplied to a room from outside and the air exhausted from the room to outside. The efficiency of heat exchange is effectively improved by simultaneously exchange temperature, which is latent heat, and humidity, which is sensible heat, between the supply air and the exhaust air, that is, by performing total heat exchange.

A total heat exchanger used for total heat exchange typically includes flat partition plates and corrugated spacing plates, which are alternately stacked on top of one another. The partition plates and the spacing plates are stacked such that the directions of corrugation of the spacing plates are alternately orthogonal to each other. This structure thus forms passages for air supply and passages for air exhaust.

For example, in winter, the outdoor air, which is supply air, and the indoor air, which is exhaust air, pass through the passages separated by the spacing plates. At this time, the temperature and humidity are exchanged between the supply air and the exhaust air through the partition plates. The partition plates through which heat exchange takes place have moisture permeability such that water vapor passes through but air does not pass through the partition plates. The partition plates also have ventilation properties and gas shielding properties attributed to separation between the supply air and the exhaust air. As a result, the supply air is warmed and humidified before being supplied to a room, and the exhaust air is cooled and dehumidified before being discharged to outside. The partition plates having both moisture permeability and gas shielding properties allow ventilation attributed to total heat exchange.

With the widespread use of total heat exchangers, the materials of partition plates needs to have moisture resistance in order that total heat exchangers can be placed in an environment in which condensation easily occurs due to a large difference in temperature between the supply air and the exhaust air. Examples of the environment in which condensation easily occurs include cold areas, bathrooms, and heated pools. In total heat exchangers known in the related art, the moisture permeability of partition plates and the efficiency of total heat exchange have been improved by adding a moisture-absorbing salt, such as lithium chloride or calcium chloride, to the partition plates.

The partition plates containing a moisture-absorbing salt absorb, when used in an environment in which condensation easily occurs, too much moisture to be retained in the partition plates. This causes elution of the moisture-absorbing salt and prevents the partition plates from maintaining its performance. An effective way to improve the moisture permeability of partition plates without adding a moisture-absorbing salt to the partition plates is to reduce moisture permeation resistance by using thinned moisture-permeable membranes. It is, however, difficult to reduce the thickness of moisture-permeable membranes in paper partition plates to a thickness greater than or equal to the thickness of pulp fiber, which are commonly used as partition plates. For this, resin partition plates have been proposed.

A known total heat exchanger performs total heat exchange of sensible heat and latent heat between the supply air and the exhaust air by using, for example, a resin partition plate including polytetrafluoroethylene (PTFE), which is a porous resin membrane, between a non-woven fabric and a cured moisture-permeable resin. A resin partition plate including, for example, a polyurethane moisture-permeable resin is produced by applying a coating liquid of a mixture of two components, a polyol and a polyisocyanate, in a fluid state before completion of the curing reaction and then thermally curing the coating liquid.

A partition plate including a polyurethane resin dispersed in water, which is a polar protic solvent, on one side of a porous substrate is also known as a resin partition plate.

Patent Literature 1 discloses a moisture-permeable waterproof sheet having a solvent-based polyurethane resin on one side of a porous substrate and a reinforcing fabric on the other side. The moisture-permeable waterproof sheet described in Patent Literature 1, which is not intended for total heat exchangers, is produced by applying a polyurethane resin composition with a viscosity of 1000 mPa·s to 30000 mPa·s to at least one side of the continuous porous substrate, and drying the polyurethane resin composition.

CITATION LIST

Patent Literature

Patent Literature 1: Japanese Unexamined Patent Application Publication No. 2010-215918

SUMMARY OF INVENTION

Technical Problem

When a partition plate is produced by the method described in Patent Literature 1, a coating film with a thickness of 10 μm can be formed, but the moisture permeability tends to decrease with increasing thickness. When the coating film is thinned to obtain high moisture permeability, it is difficult to stably form the film because the polyurethane resin composition has a high viscosity.

The porous substrate is a substrate having fine interconnected pores with pore sizes of 0.1 μm or less. In some area of the porous substrate, pores with pore sizes larger than 0.1 μm are scattered as defects, and not a few pinholes formed by connecting the defects to each other are present. To reduce the thickness of the coating film by lowering the viscosity, it is necessary to prevent or reduce penetration of the coating liquid caused by pinholes in the porous substrate. If the penetration of the resin occurs, the resin on the coating surface comes into contact with the penetrated resin when a partition plate is wound into a roll form during production of the partition plate, generating adhesion called blocking due to surface tackiness. The generation of the adhesion causes, when the partition plate is unwound, peeling of the resin from the substrate to degrade gas shielding properties.

The present disclosure is made to solve the above problem and directed to a partition plate in which resin penetration is unlikely to occur during production, a total heat exchange element including the partition plate and a total heat exchanger including the partition plate, and a method for producing a partition plate.

Solution to Problem

A partition plate according to an embodiment of the present disclosure includes: a first layer including a first porous substrate having a plurality of first pores, the first layer having a first pinhole formed by at least some of the first pores; a second layer stacked on the first layer and including a second porous substrate having a plurality of second pores, the second layer having a second pinhole formed by at least some of the second pores, the second pinhole being located at a position different from a position facing the first pinhole; and a third layer stacked on the second layer and made of a water-insoluble moisture-permeable resin.

Advantageous Effects of Invention

In a partition plate according to an embodiment of the present disclosure, the first pinhole of the first layer and the second pinhole of the second layer are located at different positions and do not communicate with each other. With this configuration, the water-insoluble moisture-permeable resin, which is the third layer stacked on the first layer and the second layer, does not pass through the first pinhole or the second pinhole. The partition plate in which the resin is unlikely to penetrate the first layer and the second layer can be obtained accordingly.

DESCRIPTION OF EMBODIMENTS

Embodiment 1

<Structure of Partition Plate 4>

Figure 1:
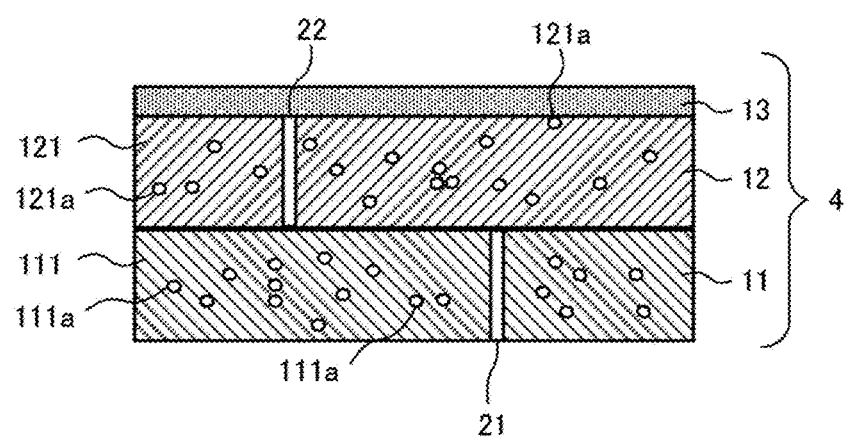
FIG. 1 is a cross-sectional view of a partition plate according to Embodiment 1.

A partition plate 4 according to an embodiment of the present disclosure will be described below. The relationship between the sizes of components in the following drawings may be different from the actual one. In the following drawings, the same reference characters denote the same or corresponding components. The same applies to the entire description. In addition, the forms of components in the entire description are merely illustrative and not restrictive.

FIG. 1 is a cross-sectional view of the partition plate 4 according to Embodiment 1. Referring to FIG. 1, the partition plate 4 has a three-layer structure in which a first layer 11, a second layer 12, and a third layer 13 are stacked on top of one another.

The first layer 11 is a first porous substrate 111 having a plurality of first pores 111a. The first pores 111a are, for example, bubbles. The first porous substrate 111 of the first layer 11 has a first pinhole 21 formed by at least some of the first pores 111a. The first pinhole 21 is a through-hole formed by connecting the first pores 111a to each other.

The second layer 12 is a second porous substrate 121 having a plurality of second pores 121a. The second pores 121a are, for example, bubbles. The second porous substrate 121 of the second layer 12 has a second pinhole 22 formed by at least some of the second pores 121a. The second pinhole 22 is located at a position different from that of the first pinhole 21 formed in the first layer 11 on which the second layer 12 is stacked. In other words, the second pinhole 22 is located at a position different from a position facing the first pinhole 21. The second pinhole 22 is located at a position away from the first pinhole 21 formed in the first layer 11 on which the second layer 12 is stacked. The second pinhole 22 is a through-hole formed by connecting the second pores 121a to each other. Since the first pinhole 21 and the second pinhole 22 are positioned so as not to overlap each other, the first pinhole 21 and the second pinhole 22 in the partition plate 4 do not communicate with each other.

The third layer 13 is stacked on a multilayer body in which the first layer 11 and the second layer 12 are stacked on top of one another. The third layer 13 is made of a water-insoluble moisture-permeable resin.

If a coating liquid of a mixture of two components, a polyol and a polyisocyanate, is used as the third layer 13 instead of using a water-insoluble moisture-permeable resin, the coating liquid has a problem of storage stability. If this coating liquid is used in the partition plate, the resin may lose its fluidity during film formation. In Embodiment 1, the use of the water-insoluble moisture-permeable resin as the third layer 13 can maintain production stability without losing the fluidity during film formation.

If a water dispersion-type polyurethane resin is used as the third layer 13 instead of using a water-insoluble moisture-permeable resin, the water dispersion-type polyurethane resin has polyethylene oxide in side chains. When being placed in an environment with a high humidity and a high temperature of 50 to 70 degrees C. or higher, which is a melting point of polyethylene oxide, the water dispersion-type polyurethane resin absorbs moisture and undergoes, for example, deformation caused by swelling. In Embodiment 1, the use of the water-insoluble moisture-permeable resin as the third layer 13 can maintain moisture permeability and long-term stability with less deformation caused by swelling.

<Method for Producing Partition Plate 4>

Figure 2:
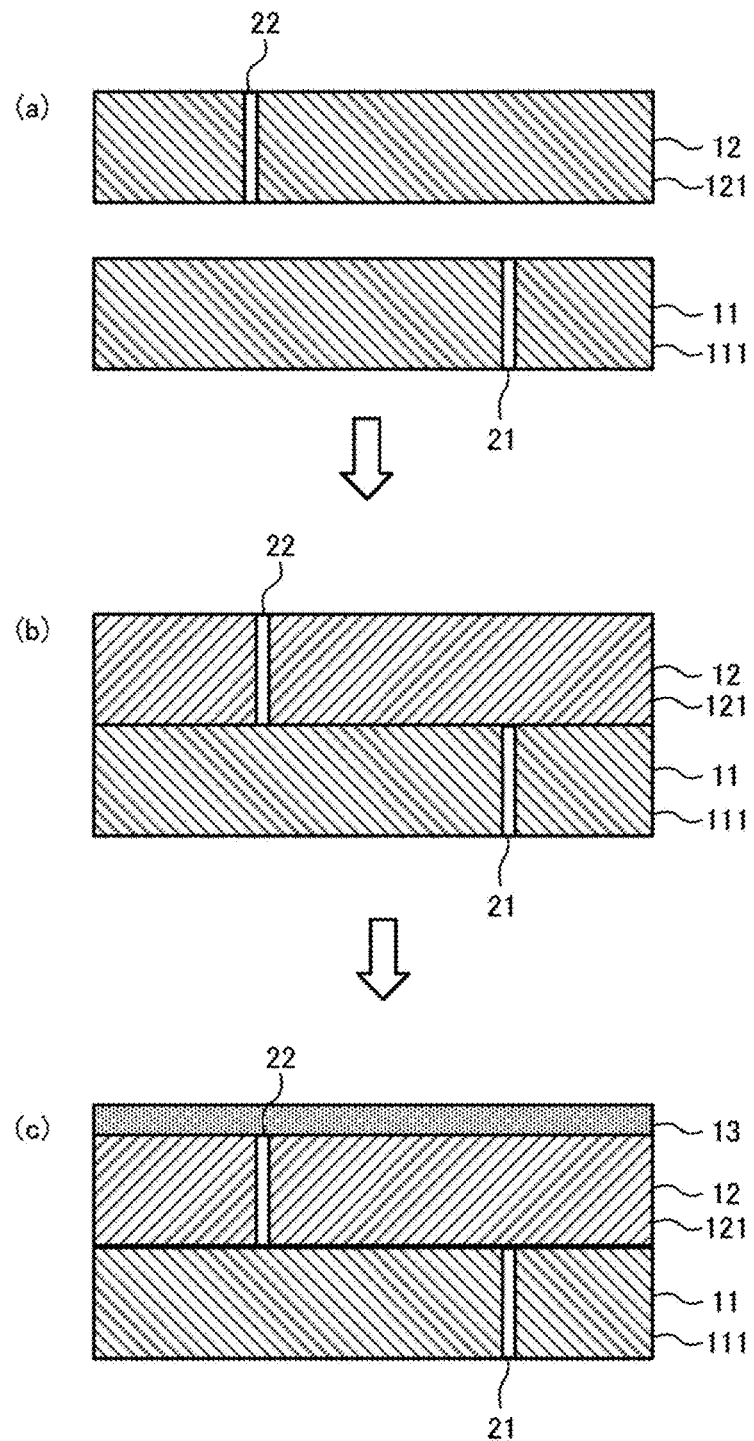
FIG. 2 is a schematic view for describing the process for producing the partition plate according to Embodiment 1.

FIG. 2 is a schematic view for describing the process for producing the partition plate 4 according to Embodiment 1. Referring to FIG. 2, the process for producing the partition plate 4 includes a stacking step of stacking the first layer 11 and the second layer 12 on top of one another and an applying step of applying a water-insoluble moisture-permeable resin solution to the stacked first layer 11 and second layer 12. In FIG. 2, the first pores 111a and the second pores 121a are not illustrated.

First, referring to FIG. 2(a), the first layer 11 and the second layer 12 are prepared in a preparing step. Referring to FIG. 2(b), the prepared first layer 11 and second layer 12 are stacked on top of one another in the stacking step to produce a porous substrate with a two-layer structure. The first layer 11 is the first porous substrate 111 having the first pinhole 21. The second layer 12 is the second porous substrate 121 having the second pinhole 22. The stacking step produces the porous substrate with a two-layer structure in which the first pinhole 21 and the second pinhole 22 are located at different positions.

Next, referring to FIG. 2(c), the water-insoluble moisture-permeable resin is applied to the surface of the second porous substrate 121 of the second layer 12 in the applying step to form the third layer 13. The applying step may include a drying step. The drying step involves drying the water-insoluble moisture-permeable resin applied to the surface of the second porous substrate 121 of the second layer 12.

The partition plate 4 including the first layer 11, the second layer 12, and the third layer 13, which are stacked on top of one another, is produced through the above process.

It is noted that the same multilayer body is also produced by preparing in advance a porous substrate with a two-layer structure in which the first porous substrate 111 and the second porous substrate 121 are stacked on top of one another, and subjecting the prepared porous substrate with a two-layer structure to the applying step illustrated in FIG. 4(c).

<Properties of First Porous Substrate 111 of First Layer 11>
Material of First Porous Substrate 111

Examples of the material of the first porous substrate 111 include resins, such as polyamides, such as aramid or Nylon (registered trademark), polyesters, polyethylenes, polypropylenes, polycarbonates, polyimides, polyethylene terephthalate, cellulose, and rayon; and glass. Of these, polyolefin resins, such as polyethylene and polypropylene, are preferred due to its low hygroscopicity.

Shape of First Porous Substrate 111

The first porous substrate 111 preferably has been processed into a film shape or sheet shape.

Porosification Method for First Porous Substrate 111

The first porous substrate 111 can be produced by employing a porosification method, such as a stretching method, a phase separation method, a crazing method, a self-organization method, or a track etching method. Of these methods, porosification using a stretching method is preferred in view of productivity. Knitted fabrics, woven fabrics, non-woven fabrics made by randomly stacking fibers, or other fabrics are not suitably used as a porous substrate because the void uniformity and surface smoothness of these fabrics are too poor to obtain uniform coating accuracy.

Porosity of First Porous Substrate 111

The porosity of the first porous substrate 111 is preferably 30% or more and 80% or less, more preferably 35% or more and 65% or less. When the first porous substrate 111 has a porosity of 30% or more, the first porous substrate 111 maintains an effective moisture permeation area and has sufficient moisture permeation performance. When the first porous substrate 111 has a porosity of 80% or less, the first porous substrate 111 maintains strength enough to prevent a decrease in processability.

Method for Calculating Porosity of First Porous Substrate 111

To calculate the porosity of the first porous substrate 111, first, the material of the first porous substrate 111 having a film shape is cut into a square with a side length of 10 cm, and the weight W (g) and the thickness D (cm) are measured. Next, the weights of the materials in a sample of the first porous substrate 111 are determined by calculation, and the weight Wi (g) of each material is divided by the true specific gravity to calculate the volume of each material. The porosity (vol %) is determined from the following formula.

$$\text{Porosity (vol \%)} = 100 - [\{(W_1/\text{true specific gravity}_1) + (W_2/\text{true specific gravity}_2) + \ldots + (W_n/\text{true specific gravity}_n)\}/(10 \times 10 - D)] \times 100 \quad [\text{Math. 1}]$$

Average Pore Size of First Pores 111a

The first pores 111a preferably have an average pore size of 0.01 μm or more and 0.1 μm or less. When the first pores 111a have an average pore size of 0.01 μm or more, an increase in adsorption of moisture to the first porous substrate 111 with increasing specific surface area of the first porous substrate 111 is prevented. When the first pores 111a have an average pore size of 0.1 μm or less, the penetration of the coating liquid through the first porous substrate 111 is reduced or prevented during application of the coating liquid for forming the third layer 13. The average pore size can be measured by using gas adsorption using nitrogen gas in combination with mercury intrusion.

Air Permeability of First Porous Substrate 111

The air permeability of the first porous substrate 111 is preferably 400 seconds or less. When the first porous substrate 111 has an air permeability of 400 seconds or less, a decrease in moisture permeation effective area is reduced or prevented, and sufficient moisture permeation performance can be obtained. The "air permeability" means the air permeability measured in accordance with JIS P8117. Specifically, the air permeability of the water-insoluble porous substrate layer is obtained by measuring the time (sec) for 100 cm³ (100 mL) of air to permeate through a substrate with an area of 645 mm².

Ratio of Average Pore Size of First Pores 111a to Porosity

The ratio of the average pore size of the first pores 111a to the porosity (average pore size (μm)/porosity) is preferably 0.0001 to 0.0033. With the ratio in this range, the first porous substrate 111 alone has moisture permeability, and the coating liquid is unlikely to penetrate the first porous substrate 111.

Thickness of First Porous Substrate 111

The first porous substrate 111 preferably has a thickness of 2 μm or more and 25 μm or less, and more preferably has a thickness of 5 μm or more and 15 μm or less. When the first porous substrate 111 has a thickness of 2 μm or more, the strength needed for the partition plate 4 is obtained. When the first porous substrate 111 has a thickness of less than 25 μm, the first porous substrate 111 has moisture permeability.

<Properties of Second Porous Substrate 121 of Second Layer 12>
Material of Second Porous Substrate 121

Examples of the material of the second porous substrate 121 include resins, such as polyamides, such as aramid or Nylon (registered trademark), polyesters, polyethylenes, polypropylenes, polycarbonates, polyimides, polyethylene terephthalate, cellulose, and rayon; and glass. Polyolefin resins, such as polyethylene and polypropylene, are preferred due to its low hygroscopicity. The materials that may be used as the second porous substrate 121 are the same as the materials that may be used as the first porous substrate 111.

The first porous substrate 111 and the second porous substrate 121 are preferably made of the same material. When the first porous substrate 111 and the second porous substrate 121 are made of the same material, there is less risk of peeling caused by a difference in coefficient of thermal expansion or moisture absorption.

Shape of Second Porous Substrate 121

Like the first porous substrate 111, the second porous substrate 121 preferably has been processed into a film shape or sheet shape.

Porosification Method for Second Porous Substrate 121

The porosification method for the second porous substrate 121 uses a stretching method, a phase separation method, a crazing method, a self-organization method, a track etching method, or other methods to form the second porous substrate 121, as for the first porous substrate 111. Among these methods, porosification using a stretching method is preferred in view of productivity. Non-woven fabrics made by stacking fibers or other fabrics are not preferred because the void uniformity and surface smoothness are too poor to obtain uniform coating accuracy.

Surface of Second Porous Substrate 121

The surface of the second porous substrate 121 preferably has wettability improved by surface modification to facilitate formation of the third layer 13. Specifically, the surface can be modified by treatment with corona, plasma, ozone, or ultraviolet radiation, or other treatments. The surface is preferably modified by treatment with corona among these treatments. These surface modification methods may be appropriately adjusted according to the type of the second porous substrate 121.

Porosity of Second Porous Substrate 121

Like the first porous substrate 111, the second porous substrate 121 preferably has a porous substrate of 30% or more and 80% or less, and more preferably has a porosity of 35% or more and 65% or less. When the second porous substrate 121 has a porosity of 30% or more, the second porous substrate 121 maintains an effective moisture permeation area and has sufficient moisture permeation performance. When the second porous substrate 121 has a porosity of 80% or less, the second porous substrate 121 maintains enough strength and can prevent or reduce a decrease in processability. The method for calculating the porosity of the second porous substrate 121 may be the same as the method for calculating the porosity of the first porous substrate 111.

Average Pore Size of Second Pores 121a

The second pores 121a preferably have an average pore size of 0.01 µm or more and 0.1 µm or less, like the first pores 111a of the first porous substrate 111. When the second pores 121a have an average pore size of 0.01 µm or more, an increase in adsorption of moisture to the second porous substrate 121 with increasing specific surface area of the second porous substrate 121 is prevented. When the second pores 121a have an average pore size of 0.1 µm or less, the penetration of the coating liquid through the second porous substrate 121 is reduced or prevented during application of the coating liquid for forming the third layer 13. The method for measuring the average pore size of the second pores 121a may be the same as the method for measuring the average pore size of the first pores 111a of the first porous substrate 111.

Air Permeability of Second Porous Substrate 121

Like the first porous substrate 111, the second porous substrate 121 preferably has an air permeability of 400 seconds or less. When the second porous substrate 121 has an air permeability of 400 seconds or less, a decrease in moisture permeation effective area is reduced or prevented, and sufficient moisture permeation performance can be obtained. The air permeability of the second porous substrate 121 has the same definition as the air permeability of the first porous substrate 111.

Ratio of Average Pore Size of Second Pores 121a to Porosity

The ratio of the average pore size of the second pores 121a to the porosity is preferably 0.0001 to 0.0033, like the ratio of the average pore size of the first pores 111a to the porosity in the first porous substrate 111. The ratio of the average pore size of the second pores 121a to the porosity is calculated from the average pore size (si)/porosity. With the ratio in this range, the second porous substrate 121 alone has moisture permeability, and the coating liquid is less likely to penetrate the second porous substrate 121.

Thickness of Second Porous Substrate 121

Like the first porous substrate 111, the second porous substrate 121 preferably has a thickness of 2 µm or more and 25 µm or less, and more preferably has a thickness of 5 µm or more and 15 µm or less. When the second porous substrate 121 has a thickness of 2 µm or more, the strength needed for the partition plate 4 is obtained. When the second porous substrate 121 has a thickness of less than 25 µm, the second porous substrate 121 has moisture permeability.

<Method for Stacking First Layer 11 and Second Layer 12>

A method for stacking the first layer 11 and the second layer 12 may involve making the first porous substrate 111 and the second porous substrate 121 porous by stretching the first porous substrate 111 and the second porous substrate 121 before porosification with the first porous substrate 111 and the second porous substrate 121 stacked and bonded to each other under pressure. The first pinhole 21 and the second pinhole 22 are formed at unspecified positions in the first layer 11 and the second layer 12, respectively. In other words, the first pinhole 21 is formed at a position away from the position facing the position of the second pinhole 22. The position of the first pinhole 21 is unlikely to coincide with the position of the second pinhole 22 when the first layer 11 and the second layer 12 are stacked on top of one another. This configuration can significantly reduce the possibility of penetration of the water-insoluble moisture-permeable resin for forming the third layer 13. With the first layer 11 and the second layer 12 stacked on top of one another, an interface is formed on the contact surface between the first porous substrate 111 and the second porous substrate 121. The presence of the interface hinders communication between the first pinhole 21 and the second pinhole 22 and reduces the penetration of the water-insoluble moisture-permeable resin.

<Thickness of Multilayer Body of First Layer 11 and Second Layer 12>

The multilayer body of the first layer 11 and the second layer 12 preferably has a thickness of 10 µm or more and 50 µm or less. When the multilayer body of the first layer 11 and the second layer 12 has a thickness of 10 µm or more, the multilayer body of the first layer 11 and the second layer 12 maintains its tension strength and is unlikely to undergo stretching caused by tension during coating. When the multilayer body of the first layer 11 and the second layer 12 has a thickness of 50 µm or less, the multilayer body has moisture permeability.

<Heat Shrinkage Rate of Multilayer Body of First Layer 11 and Second Layer 12>

The heat shrinkage rate of the multilayer body of the first layer 11 and the second layer 12 in the MD is 3% or less. The MD refers to the machine direction indicating the direction of the flow of the material of the first layer 11 and the second layer 12. When the heat shrinkage rate in the MD is 3% or less, wrinkles caused by shrinkage during heating and drying are less likely to form. The heat shrinkage rate of the multilayer body of the first layer 11 and the second layer 12 in the TD is 3% or less. The TD refers to the transverse direction indicating the vertical direction. When the heat shrinkage rate in the TD is 3% or less, wrinkles caused by shrinkage during heating and drying are less likely to form.

<Properties of Third Layer 13>
Material of Third Layer 13

Examples of the material of the water-insoluble moisture-permeable resin for forming the third layer 13 include ether-based polyurethane resins, ester-based polyurethane resins, polyester-based resins, and polyamide-based resins. Suitable examples of the material of the water-insoluble moisture-permeable resin for forming the third layer 13 include ether-based polyurethane resins that have high hydrolysis resistance, that are expected to have a life long enough as the partition plate 4, and that have high moisture permeability. Of ether-based polyurethane resins, a polyurethane resin having polyethylene oxide in a main chain is preferably used. The material of the water-insoluble moisture-permeable resin used as the third layer 13 is not limited to the resins described above and may be any resin that has high hydrolysis resistance, that is expected to have a long life, and that has high moisture permeability. Of water-insoluble moisture-permeable resins, in particular, solvent-soluble and water-insoluble moisture-permeable resins are preferred. Of these, water-insoluble moisture-permeable resins soluble in aprotic polar solvents, such as dimethylformamide and dimethylacetamide, are preferred. Water dispersion-type moisture-permeable resins or water-soluble moisture-permeable resins are not preferred because they have higher affinity for water than water-insoluble moisture-permeable resins and have poor water resistance.

Thickness of Third Layer 13

The third layer 13 preferably has a thickness of 0.1 to 5 μm. When the third layer 13 has a thickness of 0.1 μm or more, the third layer 13 has sufficient gas shielding properties. When the third layer 13 has a thickness of less than 5 μm, the third layer 13 has sufficient moisture permeability and can prevent or reduce occurrence of blocking.

Method for Applying Solution Containing Water-Insoluble Moisture-Permeable Resin of Third Layer 13

A solution containing a water-insoluble moisture-permeable resin of the third layer 13 is applied to a multilayer body of the first layer 11 and the second layer 12. The method for applying a coating liquid, which is the solution containing the water-insoluble moisture-permeable resin, can use various coaters, such as gravure coaters, kiss coaters, roll knife coaters, comma coaters, rod coaters, reverse roll coaters, and die coaters. Of these coaters, gravure coaters are preferred because they show good thin film coating properties.

Solid Content of Water-Insoluble Moisture-Permeable Resin Solution Used for Third Layer 13

The water-insoluble moisture-permeable resin solution used for the third Layer 13 preferably has a solid content of 1% to 10%. When the solid content is 1% or more, a large coating thickness is not required to obtain a desired thickness after drying, which can reduce the load during drying. When the solid content is less than 10%, the solution does not have a high viscosity, which can prevent a decrease in film formability.

Viscosity of Water-Insoluble Moisture-Permeable Resin Solution Used for Third Layer 13

The water-insoluble moisture-permeable resin solution used for the third Layer 13 preferably has a viscosity of less than 1,000 mPa-sec. When the solution has a viscosity of 1,000 mPa-sec or more, the solution slowly spreads on a coater unit and shows poor coating properties, which is not preferred.

Temperature Dung Drying of Third Layer 13

The temperature dung drying of the water-insoluble moisture-permeable resin solution applied as the third layer 13 is appropriately adjusted according to the type of the first porous substrate 111 and the second porous substrate 121 or the type of the solvent used for the water-insoluble moisture-permeable resin solution.

Additives in Third Layer 13

The water-insoluble moisture-permeable resin of the third layer 13 may contain additives, such as flame retardants, heat stabilizers, antioxidants, UV inhibitors, plasticizers, crystal nucleating agents, foaming agents, antibacterial and antifungal agents, fillers, antistatic agents, and defoaming agents, unless the additives inhibit the moisture permeability and the gas shielding properties. These additives may be used alone or in combination of two or more. The content of each additive can be appropriately adjusted according to the type of additive.

Since stacking the first layer 11 and the second layer 12 prevents the first pinhole 21 and the second pinhole 22 from passing through in the stacking direction, blocking caused by penetration of the water-insoluble moisture-permeable resin, which forms the third layer 13, in the stacking direction is unlikely to occur.

In the partition plate 4 according to Embodiment 1 described above, the first layer 11 having the first pinhole 21, the second layer 12 having the second pinhole 22 at a position away from the first pinhole 21, and the third layer 13 made of the water-insoluble moisture-permeable resin are stacked on top of one another. This configuration prevents the water-insoluble moisture-permeable resin serving as the third layer 13 from passing through the first pinhole 21 and the second pinhole 22 or penetrating in the stacking direction. If the penetration of the resin occurs, the resin on the coating surface comes into contact with the penetrated resin when the partition plate 4 is wound into a roll form, generating adhesion called blocking due to surface tackiness. In the partition plate 4 in which the first pinhole 21 and the second pinhole 22 are located at different positions, the resin is unlikely to penetrate during production of the partition plate 4. This can provide the partition plate 4 that has blocking resistance.

When the first porous substrate 111 of the first layer 11 and the second porous substrate 121 of the second layer 12 are stretched porous substrates made porous by a stretching method, the porous substrates have less variation in pores than non-woven fabrics or other fabrics and thus have stable properties. The stretched porous substrates have better smoothness than non-woven fabrics or other fabrics and tend to reduce variations in the thickness of the applied water-insoluble moisture-permeable resin.

The first porous substrate 111 having a porosity of 30% to 80% has both moisture permeability and processing strength. Specifically, when the porous substrate has a porosity of 30% or more, it is possible to prevent insufficient moisture permeation performance resulting from a reduction in effective moisture permeation area. When the porous substrate has a porosity of 80% or less, it is possible to prevent deterioration in processability caused by reduced strength.

When the first porous substrate 111 has an average pore size of 0.01 μm or more, it is possible to prevent an increase in adsorption of moisture to the first porous substrate 111 with increasing specific surface area of the first porous substrate 111. When the first porous substrate 111 has an average pore size of less than 0.1 μm, it is possible to keep the condition in which the coating liquid during application of the coating liquid is unlikely to penetrate the first porous substrate 111.

When the first porous substrate 111 has an air permeability of 400 seconds or less, it is possible to prevent insufficient moisture permeation performance of the partition plate 4 resulting from a reduction in moisture permeation effective area.

The second porous substrate 121 having a porosity of 30% to 80% has both moisture permeability and processing strength. When the second porous substrate 121 has a porosity of 30% or more, it is possible to prevent insufficient moisture permeation performance resulting from a reduction in effective moisture permeation area. When the second porous substrate 121 has a porosity of 80% or less, it is possible to prevent deterioration in processability caused by reduced strength.

When the second porous substrate 121 has an average pore size of 0.01 μm or more, it is possible to prevent an increase in adsorption of moisture to the second porous substrate 121 with increasing specific surface area of the second porous substrate 121. When the second porous substrate 121 has an average pore size of less than 0.1 μm, it is possible to keep the condition in which the coating liquid during application of the coating liquid is unlikely to penetrate the first porous substrate 111.

When the second porous substrate 121 has an air permeability of 400 seconds or less, it is possible to prevent insufficient moisture permeation performance resulting from a reduction in moisture permeation effective area.

When the water-insoluble moisture-permeable resin is a polyurethane resin having polyethylene oxide, polyethylene oxide contributes to an improvement in the moisture permeation performance of the partition plate 4.

According to the method for producing the partition plate 4 according to Embodiment 1 described above, the stacking step forms the porous substrate with a two-layer structure in which the first pinhole 21 and the second pinhole 22 are located at different positions. The applying step involves applying the water-insoluble moisture-permeable resin solution for forming the third layer 13. It is thus possible to prevent the water-insoluble moisture-permeable resin solution from passing through the first layer 11 and the second layer 12 and penetrating the porous substrate.

According to the method for producing the partition plate 4 according to Embodiment 1 described above, the applying step involves applying the water-insoluble moisture-permeable resin solution to the substrate in which the first layer 11 and the second layer 12 are stacked on top of one another. Since the substrate in which the first layer 11 and the second layer 12 are stacked on top of one another has the first pinhole 21 and the second pinhole 22 at different positions, this configuration can prevent the water-insoluble moisture-permeable resin solution from passing through the first layer 11 and the second layer 12 and penetrating the substrate.

The applying step includes a drying step. This can form the third layer 13.

The solvent used for the water-insoluble moisture-permeable resin is an aprotic polar solvent. Resins soluble in aprotic polar solvents have higher water resistance than resins soluble in protic polar solvents and can provide the partition plate 4 having high water resistance.

In addition, the viscosity of the water-insoluble moisture-permeable resin solution is controlled at less than 1000 mPa·sec to improve the conformability of the resin to a target member during coating to improve coating properties.

Embodiment 2

Figure 3:
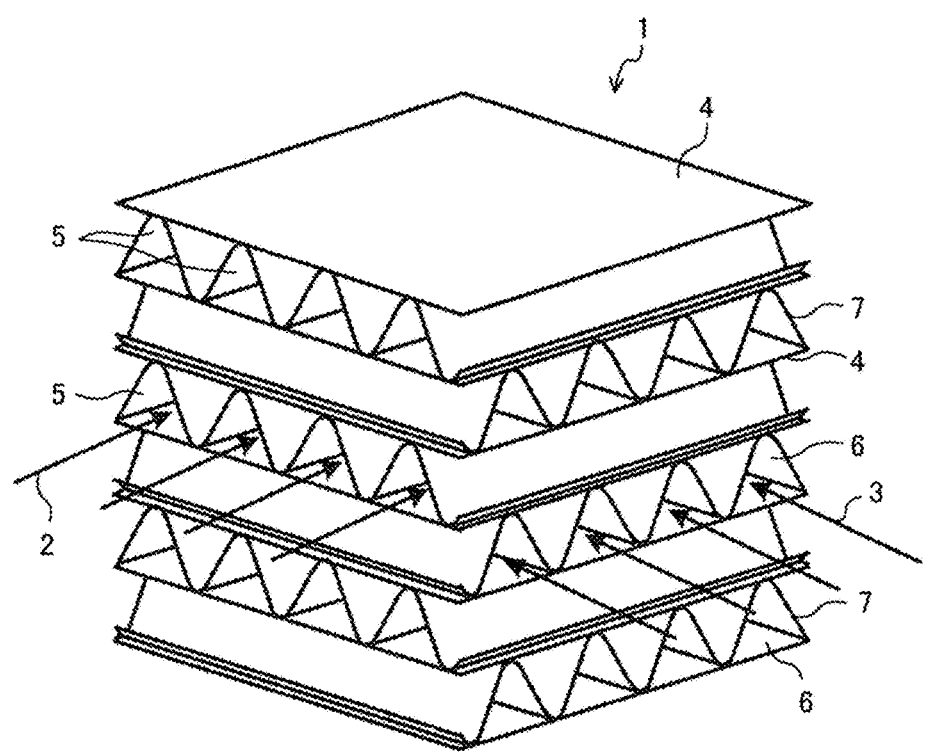
FIG. 3 is a perspective view of a total heat exchange element according to Embodiment 2.

FIG. 3 is a perspective view of a total heat exchange element 1 according to Embodiment 2. The total heat exchange element 1 according to Embodiment 2 has the partition plate 4 according to Embodiment 1. Since the partition plate 4 has the same structure as in Embodiment 1, description of the partition plate 4 is omitted, and the same or corresponding elements are assigned with the same reference signs.

<Structure of Total Heat Exchange Element 1>

Referring to FIG. 3, the total heat exchange element 1 is a multilayer body in which supply air layers 2 and exhaust air layers 3 are alternately stacked on top of one another with partition plates 4 therebetween. The supply air flows through the supply air layers 2, and the exhaust air flows through the exhaust air layers 3. The supply air layers 2 are example first gas layers. The exhaust air layers 3 are example second gas layers. The total heat exchange element 1 includes a plurality of partition plates 4 and a plurality of spacing plates 7. The spacing plates 7 alternate with the partition plates 4, and each spacing plate 7 is disposed between the partition plates 4. The spacing plates 7 have, for example, a corrugated shape. The partition plates 4 are spaced apart from each other with the spacing plates 7 therebetween.

The supply air layers 2 each have supply air channels 5. The supply air channels 5 guide the flow of supply air along the partition plates 4. The exhaust air layers 3 each have exhaust air channels 6. The exhaust air channels 6 guide the flow of exhaust air along the partition plates 4. The supply air channels 5 and the exhaust air channels 6 are formed by the corrugated spacing plates 7. The spacing plates 7 keep a distance between the partition plates 4. The direction in which the supply air channels 5 guide supply air is perpendicular to the direction in which the exhaust air channels 6 guide exhaust air.

<Structure of Spacing Plate 7>

The spacing plates 7 are corrugated sheets. Each spacing plate 7 is any plate that can keep a predetermined distance between the partition plates 4 and can form passages. Each spacing plate 7 may be, for example, a sheet folded to a square wave or triangle wave, or may be, for example, a combination of two or more plate pieces. The spacing plates 7 are made of a material having an air permeability of 10 seconds or more. Various materials, such as paper, resins, metals, and ceramics, can be used as the material of the spacing plates 7. Of these materials, lightweight and water-resistant materials are preferred, and members made of resin are preferred, and polypropylene, polyethylene, ABS, polystyrene, polyamides, polyethylene terephthalate, polybutylene terephthalate, and other resins are preferred. In the case of using these spacing plates, an adhesive is preferably applied to the surfaces of the spacing plates to be in contact with the partition plates to prevent misalignment.

<Operation of Total Heat Exchange Element 1>

The operation of the total heat exchange element 1 will be described. For example, cold and dry outside air, or supply air, flows through the supply air layers 2 of the total heat exchange element 1. Warm and humid indoor air, or exhaust air, flows through the exhaust air layers 3 of the total heat exchange element 1. At this time, water vapor in the indoor air moves from the exhaust air layers 3 to the supply air layers 2 through the partition plates 4, and sensible heat is exchanged between the exhaust air layers 3 and the supply air layers 2. The heat energy of the indoor air is transferred to the outdoor air, which is colder than the indoor air, and latent heat is exchanged between the exhaust air layers 3 and the supply air layers 2. As a result, the gas in the supply air layers 2 is warmed and humidified before being supplied to a room, and the gas in the exhaust air layers 3 is cooled and dehumidified before being discharged to outside.

The total heat exchange element 1 according to Embodiment 2 described above has the partition plate 4 including the water-insoluble moisture-permeable resin and the porous substrate, the supply air layer 2 on one surface of the partition plate 4, and the exhaust air layer 3 on the other surface of the partition plate 4. With this configuration, sensible heat and latent heat can be exchanged between the supply air layer 2 and the exhaust air layer 3. In addition, the use of the partition plate 4 can provide the total heat exchange element 1 with high water resistance.

Embodiment 3

Figure 4:
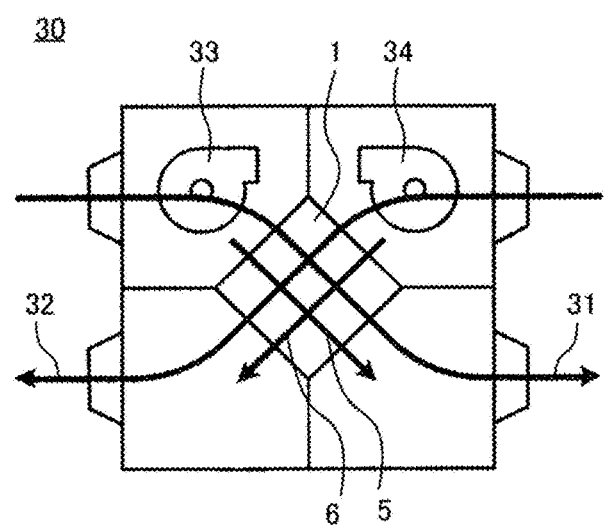
FIG. 4 is a schematic view of a total heat exchanger according to Embodiment 3.

FIG. 4 is a perspective view of a total heat exchanger 30 according to Embodiment 3. The total heat exchanger 30 according to Embodiment 3 has the partition plate 4 according to Embodiment 1. The total heat exchanger 30 according to Embodiment 3 has the total heat exchange element 1 according to Embodiment 2. Since the partition plate 4 has the same structure as in Embodiment 1, description of the partition plate 4 is omitted, and the same or corresponding elements are assigned with the same reference signs. Since the total heat exchange element 1 has the same structure as in Embodiment 2, description of the total heat exchange element 1 is omitted, and the same or corresponding elements are assigned with the same reference signs.

<Structure of Total Heat Exchanger 30>

Referring to FIG. 4, the total heat exchanger 30 according to Embodiment 3 includes the total heat exchange element 1. The total heat exchanger 30 includes a supply air passage 31 for supplying outdoor air to a room and an exhaust air passage 32 for exhausting indoor air to outside. The total heat exchanger 30 is placed in houses or other buildings and used as a heat exchange ventilation system for exchanging heat between indoor air and outdoor air.

The supply air passage 31 is partially composed of the supply air channel 5 of the total heat exchange element 1. The exhaust air passage 32 is partially composed of the exhaust air channel 6 of the total heat exchange element 1. The supply air passage 31 is provided with a supply air fan 33. The supply air fan 33 generates the flow of air from outside into the room. As the supply air fan 33 is driven, the gas flows into the supply air layer 2 of the total heat exchange element 1. The exhaust air passage 32 is provided with an exhaust air fan 34. The exhaust air fan 34 generates the flow of air from the room into the outside. As the exhaust air fan 34 is driven, the gas flows into the exhaust air layer 3 of the total heat exchange element 1. The supply air fan 33 is an example first fan. The exhaust air fan 34 is an example second fan.

When the total heat exchanger 30 starts operating, the supply air fan 33 and the exhaust air fan 34 operate. When the supply air fan 33 and the exhaust air fan 34 operate, for example, in winter, the cold and dry airflow from the outside, or supply airflow, passes through the supply air channel 5, and the warm and humid airflow from the room, or exhaust airflow, passes through the exhaust air channel 6. Two types of airflows, supply airflow and exhaust airflow, flow with the partition plate 4 therebetween.

At this time, heat is transferred between the airflows through the partition plate 4, and water vapor permeates through the partition plate 4 and moves from one airflow to the other airflow, whereby sensible heat and latent heat are exchanged between the supply airflow and the exhaust airflow. As a result, the supply airflow is warmed and humidified before being supplied to the room, and the exhaust airflow is cooled and dehumidified before being discharged to the outside.

The use of the total heat exchanger 30 can thus exchange outdoor air and indoor air while suppressing changes in indoor temperature or humidity.

According to the total heat exchanger 30 according to Embodiment 3 described above, the use of the partition plate 4 including the first porous substrate 111, the second porous substrate 121, and the water-insoluble moisture-permeable resin can provide the total heat exchange element 1 with high water resistance. This configuration can improve reliability of the total heat exchanger 30.

<Performance Evaluation of Partition Plate 4>

Samples of the partition plate 4 were produced by using the methods described in Examples 1 to 5 and Comparative Examples 1 to 5, and the produced samples of the partition plate 4 were evaluated for their performance. The gas shielding properties and the water resistance were evaluated as the performance of the partition plate 4.

First, the method for producing samples of the partition plate 4 will be described.

Example 1

In Example 1, a first porous substrate 111 having a thickness of 10 μm, a porosity of 46%, and an air permeability of 180 seconds and made of polypropylene was used as a first layer 11. The first porous substrate 111 has first pores 111a. The first pores 111a form a first pinhole 21. A second porous substrate 121 having a thickness of 10 μm, a porosity of 46%, and an air permeability of 180 seconds and made of polypropylene was used as a second layer 12. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 5% polyurethane resin solution was applied, as a coating liquid, to the multilayer body including the first layer 11 and the second layer 12, which were stacked on top of one another, by using a gravure coater such that the coating thickness was 25 μm. SANPRENE H-600 (solvent: dimethylformamide) available from Sanyo Chemical Industries, Ltd. was used as a polyurethane resin solution. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water-insoluble moisture-permeable resin was produced as a sample of Example 1.

Example 2

In Example 2, a first porous substrate 111 having a thickness of 12 μm, a porosity of 46%, and an air permeability of 190 seconds and made of polypropylene was used as a first layer 11. The first porous substrate 111 has first pores 111a. The first pores 111a form a first pinhole 21. A second porous substrate 121 having a thickness of 12 μm, a porosity of 46%, and an air permeability of 190 seconds and made of polypropylene was used as a second layer 12. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 5% polyurethane resin solution was applied, as a coating liquid, to the multilayer body including the first layer 11 and the second layer 12, which were stacked on top of one another, by using a gravure coater such that the coating thickness was 25 sm. SANPRENE H-600 (solvent: dimethylformamide) available from Sanyo Chemical Industries, Ltd. was used as a polyurethane resin solution. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water-insoluble moisture-permeable resin was produced as a sample of Example 2.

Example 3

In Example 3, a first porous substrate 111 having a thickness of 5 μm, a porosity of 46%, and an air permeability of 120 seconds and made of polypropylene was used as a first layer 11. The first porous substrate 111 has first pores 111a. The first pores 111a form a first pinhole 21. A second porous substrate 121 having a thickness of 15 μm, a porosity of 46%, and an air permeability of 200 seconds and made of polypropylene was used as a third layer 13. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 5% polyurethane resin solution was applied, as a coating liquid, to the multilayer body including the first layer 11 and the second layer 12, which were stacked on top of one another, by using a gravure coater such that the coating thickness was 25 μm. SANPRENE H-600 (solvent: dimethylformamide) available from Sanyo Chemical Industries, Ltd. was used as a polyurethane resin solution. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water-insoluble moisture-permeable resin was produced as a sample of Example 3.

Example 4

In Example 4, a first porous substrate 111 having a thickness of 10 μm, a porosity of 40%, and an air permeability of 190 seconds and made of polypropylene was used as a first layer 11. The first porous substrate 111 has first pores 111a. The first pores 111a form a first pinhole 21. A second porous substrate 121 having a thickness of 10 μm, a porosity of 46%, and an air permeability of 180 seconds and made of polypropylene was used as a second layer 12. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 5% polyurethane resin solution was applied, as a coating liquid, to the multilayer body including the first layer 11 and the second layer 12, which were stacked on top of one another, by using a gravure coater such that the coating thickness was 25 μm. SANPRENE H-600 (solvent: dimethylformamide) available from Sanyo Chemical Industries, Ltd. was used as a polyurethane resin solution. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water-insoluble moisture-permeable resin was produced as a sample of Example 4.

Example 5

In Example 5, a first porous substrate 111 having a thickness of 10 μm, a porosity of 46%, and an air permeability of 180 seconds and made of polypropylene was used as a first layer 11. The first porous substrate 111 has first pores 111a. The first pores 111a form a first pinhole 21. A second porous substrate 121 having a thickness of 10 μm, a porosity of 54%, and an air permeability of 150 seconds and made of polypropylene was used as a second layer 12. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 5% polyurethane resin solution was applied, as a coating liquid, to the multilayer body including the first layer 11 and the second layer 12, which were stacked on top of one another, by using a gravure coater such that the coating thickness was 25 μm. SANPRENE H-600 (solvent: dimethylformamide) available from Sanyo Chemical Industries, Ltd. was used as a polyurethane resin solution. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water-insoluble moisture-permeable resin was produced as a sample of Example 5.

Comparative Example 1

In Example 1, a first porous substrate 111 having a thickness of 10 μm, a porosity of 46%, and an air permeability of 180 seconds and made of polypropylene was used as a first layer 11. The first porous substrate 111 has first pores 111a. The first pores 111a form a first pinhole 21. A second porous substrate 121 having a thickness of 10 µm, a porosity of 46%, and an air permeability of 180 seconds and made of polypropylene was used as a second layer 12. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 5% polyurethane resin aqueous dispersion was applied, as a coating liquid, to the multilayer body including the first layer 11 and the second layer 12, which were stacked on top of one another, by using a gravure coater such that the coating thickness was 25 pam. Superflex E-2000 available from DKS Co. Ltd. was used as a polyurethane resin aqueous dispersion. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water dispersion-type moisture-permeable resin was produced as a sample of Comparative Example 1.

Comparative Example 2

In Comparative Example 2, a first porous substrate 111 having a thickness of 10 pam, a porosity of 46%, and an air permeability of 180 seconds and made of polypropylene was used as a first layer 11. The first porous substrate 111 has first pores 111a. The first pores 111a form a first pinhole 21. A second porous substrate 121 having a thickness of 10 µm, a porosity of 46%, and an air permeability of 180 seconds and made of polypropylene was used as a second layer 12. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 10% polyurethane resin aqueous dispersion was applied, as a coating liquid, to the multilayer body including the first layer 11 and the second layer 12, which were stacked on top of one another, by using a gravure coater such that the coating thickness was 80 µm. Superflex E-2000 available from DKS Co. Ltd. was used as a polyurethane resin aqueous dispersion. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water dispersion-type moisture-permeable resin was produced as a sample of Comparative Example 2.

Comparative Example 3

In Comparative Example 3, a first porous substrate 111 having a thickness of 10 µm, a porosity of 46%, and an air permeability of 180 seconds and made of polypropylene was used as a first layer 11. The first porous substrate 111 has first pores 111a. The first pores 111a form a first pinhole 21. A second porous substrate 121 having a thickness of 10 µm, a porosity of 46%, and an air permeability of 180 seconds and made of polypropylene was used as a second layer 12. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 10% polyurethane resin solution was applied, as a coating liquid, to the multilayer body including the first layer 11 and the second layer 12, which were stacked on top of one another, by using a gravure coater such that the coating thickness was 80 µm. SANPRENE H-600 (solvent: dimethylformamide) available from Sanyo Chemical Industries, Ltd. was used as a polyurethane resin solution. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water-insoluble moisture-permeable resin was produced as a sample of Example 3.

Comparative Example 4

In Comparative Example 4, a first porous substrate 111 having a thickness of 10 µm, a porosity of 46%, and an air permeability of 180 seconds and made of polypropylene was used as a first layer 11. The first porous substrate 111 has first pores 111a. The first pores 111a form a first pinhole 21. A second porous substrate 121 having a thickness of 10 µm, a porosity of 46%, and an air permeability of 180 seconds and made of polypropylene was used as a second layer 12. The second porous substrate 121 has second pores 121a. The second pores 121a form a second pinhole 22. The first layer 11 and the second layer 12 were stacked on top of one another to form a multilayer body in which the first pinhole 21 of the first porous substrate 111 and the second pinhole 22 of the second porous substrate 121 were located at different positions. The multilayer body in which the first layer 11 and the second layer 12 were stacked on top of one another was treated with corona to improve surface wettability.

Next, a 5% polyurethane resin solution was applied, as a coating liquid, to the multilayer body including the first layer 11 and the second layer 12, which were stacked on top of one another, by using a gravure coater such that the coating thickness was 1 sm. SANPRENE H-600 (solvent: dimethylformamide) available from Sanyo Chemical Industries, Ltd. was used as a polyurethane resin solution. The coating liquid was then dried by heating at 80 degrees C.

As described above, the partition plate 4 with a three-layer structure including the first layer 11 having the first pinhole 21, the second layer 12 having the second pinhole 22 at a position different from that of the first pinhole 21, and the third layer 13 made of water-insoluble moisture-permeable resin was produced as a sample of Comparative Example 4.

Comparative Example 5

In Comparative Example 5, a first porous substrate 111 having a thickness of 20 μm, a porosity of 46%, and an air permeability of 230 seconds and made of polypropylene was used as a first layer 11. The first porous substrate 111 has first pores 111a and has a first pinhole 21 formed by the first pores 111a. The first layer 11 was treated with corona to improve surface wettability.

Next, a 5% polyurethane resin solution was applied, as a coating liquid, to the first layer 11 by using a gravure coater such that the coating thickness was 25 μm. SANPRENE H-600 (solvent: dimethylformamide) available from Sanyo Chemical Industries, Ltd. was used as a polyurethane resin solution. The coating liquid was then dried by heating at 80 degrees C.

As described above, the partition plate 4 with a two-layer structure including the first layer 11 having the first pinhole 21 and the third layer 13 made of water-insoluble moisture-permeable resin was produced as a sample of Comparative Example 5.

Next, the method for evaluating the samples of the partition plate 4 produced in Examples 1 to 5 and Comparative Examples 1 to 5 will be described.

<Gas Shielding Properties of Partition Plate 4>

The gas shielding properties of the partition plate 4 were evaluated by measuring the air permeability of the partition plate 4 in accordance with JIS P8117. In other words, the gas shielding properties were determined by measuring the time (sec) for 100 cm$^3$ (100 mL) of air to permeate through a 645 mm$^2$ area in a sample of the partition plate 4. The air permeability of the partition plate 4 was measured at freely selected five points in the sample of the partition plate 4.

In this evaluation, when the air permeability was 5000 seconds or more at all of freely selected five points in the partition plate 4, the gas shielding properties were rated as good (A), and when the air permeability was less than 5000 seconds at any one of freely selected five points in the partition plate 4, the gas shielding properties were rated as poor (B).

<Moisture Permeability of Partition Plate 4>

The moisture permeability of the partition plate 4 was measured by using an infrared sensor method (MOCON's method) under the conditions of a relative humidity of 100% and a temperature of 30 degrees C. in accordance with JIS K7129. In other words, the amount of water vapor that had permeated through a test piece was detected with an infrared sensor and compared with that of a standard test piece to calculate the moisture permeability (water vapor permeability).

The moisture permeability of the partition plate 4 was measured at freely selected five points in a sample of the partition plate 4, and the average value of the moisture permeability measured at the five points was defined as the moisture permeability of the partition plate 4. When the moisture permeability was 12 kg/(m$^2$·day) or more, the moisture permeability was rated as good (A), and when the moisture permeability was less than 12 kg/(m$^2$·day), the moisture permeability was rated as poor (B). The moisture permeability was evaluated only for samples having good gas shielding properties, and not evaluated for samples having poor gas shielding properties.

<Water Resistance of Partition Plate 4>

The water resistance of the partition plate 4 was determined by repeating 24-hours of immersion of samples of the partition plate 4 in warm water at 40 degrees C. and subsequent 1-hour of drying of the sample at 60 degrees C. three times, and visually observing whether peeling occurred. The samples in which peeling was not observed were evaluated for their gas shielding properties.

In this evaluation, when the air permeability was 5000 seconds or more at all of freely selected five points in samples of the partition plate 4, the water resistance was rated as good (A), and when the air permeability was less than 5000 seconds at any one of freely selected five points in the partition plate 4, the water resistance was rated as poor (B). The water resistance was evaluated only for samples having good initial gas shielding properties, and the water resistance of samples in which peeling was observed in evaluation of water resistance was rated as poor (B).

<Blocking Properties of Partition Plate 4>

With regard to the blocking properties of the partition plate 4, samples were prepared by stacking two partition plates 4, 10 cm×10 cm, such that the water-insoluble moisture-permeable resin surface of the third layer 13 faced the porous substrate surface of the first layer 11. The samples were then subjected to a load of 2 kg/100 cm$^2$ under the conditions of a temperature of 20 degrees C. and a relative humidity of 65% for 24 hours. The partition plates were then peeled from each other to evaluate tackiness and peeling properties.

In this evaluation, when the partition plates were easily peeled from each other because of no tackiness, the blocking properties were rated as good (A), and when it was difficult to peel the partition plates from each other because of tackiness, the blocking properties were rated as poor (B). The blocking properties were evaluated only for samples having good gas shielding properties, and not evaluated for samples having poor gas shielding properties.

Next, the evaluation results of the samples of the partition plate 4 produced in Examples 1 to 5 and Comparative Examples 1 to 5 are shown in Table 1.

TABLE 1

|  | Gas shielding properties | Moisture permeability | Water resistance | Blocking properties |
|---|---|---|---|---|
| Example 1 | A | A | A | A |
| Example 2 | A | A | A | A |
| Example 3 | A | A | A | A |
| Example 4 | A | A | A | A |
| Example 5 | A | A | A | A |
| Comparative Example 1 | A | B | B | A |
| Comparative Example 2 | A | B | B | B |
| Comparative Example 3 | A | B | A | B |
| Comparative Example 4 | B | — | — | — |
| Comparative Example 5 | A | A | A | B |

As shown in Table 1, the gas shielding properties were good in Examples 1 to 5 and Comparative Examples 1 to 3 and Comparative Example 5 in which the coating liquid was applied to have a certain coating thickness or more. However, the gas shielding properties were poor in Comparative Example 4 in which the coating thickness was thin.

In Examples 1 to 5, the partition plate 4 includes the first layer 11 having the first pinhole 21, the second layer 12 having the second pinhole 22, and the third layer 13 made of water-insoluble moisture-permeable resin. In Examples 1 to 5 in which a water-insoluble moisture-permeable resin was used in the third layer 13, the partition plate 4 tended to have higher moisture permeability and higher water resistance than that in Comparative Examples 1 and 2 in which a water dispersion-type moisture-permeable resin was used in the third layer 13.

In Comparative Examples 2 and 3, sufficient gas shielding properties were obtained due to the coating liquid having a large coating thickness, but the moisture permeability tended to be poor. In Comparative Example 3 in which a water-insoluble moisture-permeable resin was used in the coating liquid, high water resistance was obtained. In Comparative Example 2 in which a water dispersion-type moisture-permeable resin was used in the coating liquid, the water resistance was poor. Since the coating thickness of the coating liquid in Comparative Examples 2 and 3 was larger than that in Examples 1 to 5, the blocking properties in Comparative Examples 2 and 3 were poorer than those in Examples 1 to 5.

In Comparative Example 4, sufficient gas shielding properties were not obtained due to the coating liquid having a small coating thickness, and Comparative Example 4 was not suitable as the partition plate 4.

In Comparative Example 5, sufficient gas shielding properties and sufficient moisture permeability were obtained by applying the same coating liquid with the same coating thickness as in Example 1. In Comparative Example 5, the water resistance was also high. In the evaluation of blocking properties, however, the samples of the partition plate 4 adhered to each other, which showed poor blocking properties. In Comparative Example 5 using the first layer 11 having the first pinhole 21, the blocking properties tended to be poor due to penetration of water-insoluble moisture-permeable resin.

As described above, the partition plates 4 in Examples 1 to 5 have more advantageous effects, such as better gas shielding properties, moisture permeability, water resistance, and blocking properties, than those in Comparative Examples 1 to 5. In other words, the partition plates 4 according to Examples 1 to 5 have the first layer 11 having the first pinhole 21, the second layer 12 having the second pinhole 22 at a position different from that of the first pinhole 21, and the third layer 13 made of the water-insoluble moisture-permeable resin, which are stacked on top of one another. Such a structure provides the advantageous effects described above.

REFERENCE SIGNS LIST

1: total heat exchange element, 2: supply air layer, 3: exhaust air layer, 4: partition plate, 5: supply air channel, 6: exhaust air channel, 7: spacing plate, 11: first layer, 12: second layer, 13: third layer, 21: first pinhole, 22: second pinhole, 30: total heat exchanger, 31: supply air passage, 32: exhaust air passage, 33: supply air fan, 34: exhaust air fan, 111: first porous substrate, 111a: first pore, 121: second porous substrate, 121a: second pore

The invention claimed is:

1. A partition plate comprising:
    a first layer including a first porous substrate having a plurality of first pores, the first layer having a first pinhole formed by at least some of the first pores;
    a second layer stacked on the first layer and including a second porous substrate having a plurality of second pores, the second layer having a second pinhole formed by at least some of the second pores, the second pinhole being located at a position different from a position facing the first pinhole; and
    a third layer stacked on the second layer and made of a water-insoluble moisture-permeable resin, wherein
    the first pinhole and the second pinhole are each formed by interconnected pores each having a pore size larger than an average pore size of the first pores and the average pore size of the second pores.

2. The partition plate of claim 1,
    wherein the first porous substrate of the first layer and the second porous substrate of the second layer are stretched porous substrates made porous by a stretching method.

3. The partition plate of claim 1,
    wherein the first porous substrate has a porosity of 30% to 80%.

4. The partition plate of claim 1,
    wherein the first porous substrate has an average pore size of 0.01 to 0.1 μm.

5. The partition plate of claim 1,
    wherein the first porous substrate has an air permeability of 400 seconds or less.

6. The partition plate of claim 1,
    wherein the second porous substrate has a porosity of 30% to 80%.

7. The partition plate of claim 1,
    wherein the second porous substrate has an average pore size of 0.01 to 0.1 μm.

8. The partition plate of claim 1,
    wherein the second porous substrate has an air permeability of 400 seconds or less.

9. The partition plate of claim 1,
    wherein the water-insoluble moisture-permeable resin is a polyurethane resin having polyethylene oxide.

10. A total heat exchange element comprising:
    the partition plate of claim 1;
    a first gas layer on one surface of the partition plate; and
    a second gas layer on an other surface of the partition plate.

11. A total heat exchanger comprising:
    the total heat exchange element of claim 10;
    a first fan causing gas to flow into the first gas layer; and
    a second fan causing gas to flow into the second gas layer.

12. A method for producing the partition plate of claim 1, the method comprising:
    stacking the first layer and the second layer on top of one another; and
    applying, to the stacked first layer and second layer, a solution of a water-insoluble moisture-permeable resin for forming a third layer.

13. A method for producing the partition plate of claim 1, the method comprising:
    applying a solution of a water-insoluble moisture-permeable resin to a substrate in which the first layer and the second layer are stacked on top of one another.

14. The method for producing the partition plate of claim 12, further comprising drying the solution of the water-insoluble moisture-permeable resin.

15. The method for producing the partition plate of claim 12,
    wherein a solvent used for the water-insoluble moisture-permeable resin is an aprotic polar solvent.

16. The method for producing the partition plate of claim 12,
wherein the solution of the water-insoluble moisture-permeable resin has a viscosity of less than 1,000 mPa sec.

17. The partition plate of claim 1, wherein the first pinhole and the second pinhole each have a pore size larger than 0.1 μm.

* * * * *